Figure 1:
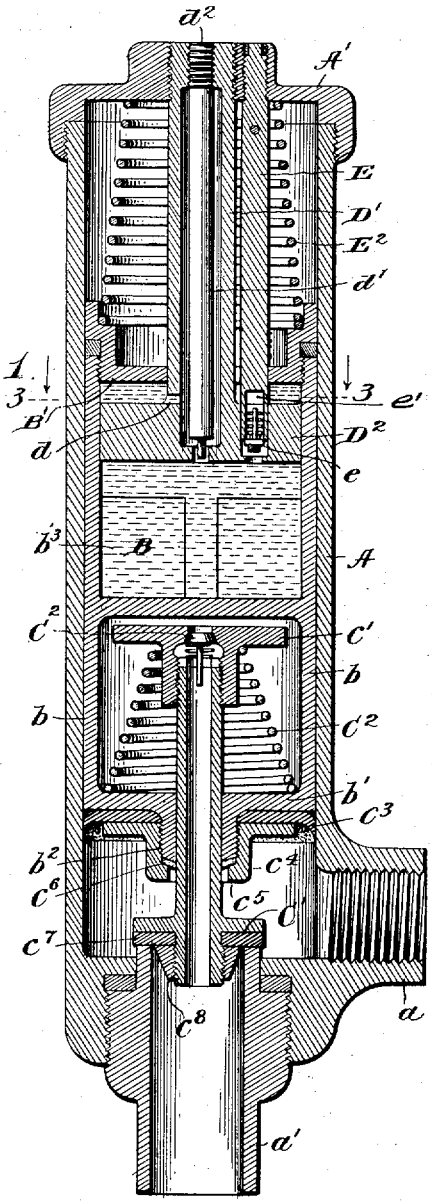

R. A. BROOKS.

FLUSHOMETER.

APPLICATION FILED OCT. 18, 1915.

Reissued Oct. 10, 1916.

14,198.

3 SHEETS—SHEET 1.

Witness:

Jas. E. Hutchinson:

By

Inventor:

Robert A. Brooks,

Bacon & Milanz Attorneys:

THE NORRIS PETERS CO., PHOTO-LITHO., WASHINGTON, D. C.

R. A. BROOKS.

FLUSHOMETER.

APPLICATION FILED OCT. 18, 1915.

Reissued Oct. 10, 1916.

14,198.

3 SHEETS—SHEET 2.

Witness:

Jas. E. Hutchinson.

By

Inventor:

Robert A. Brooks.

Bacon & Milans.

Attorneys.

THE NORRIS PETERS CO., PHOTO LITHO., WASHINGTON, D. C.

R. A. BROOKS.
FLUSHOMETER.
APPLICATION FILED OCT. 18, 1915.
Reissued Oct. 10, 1916.
14,198.
3 SHEETS—SHEET 3.
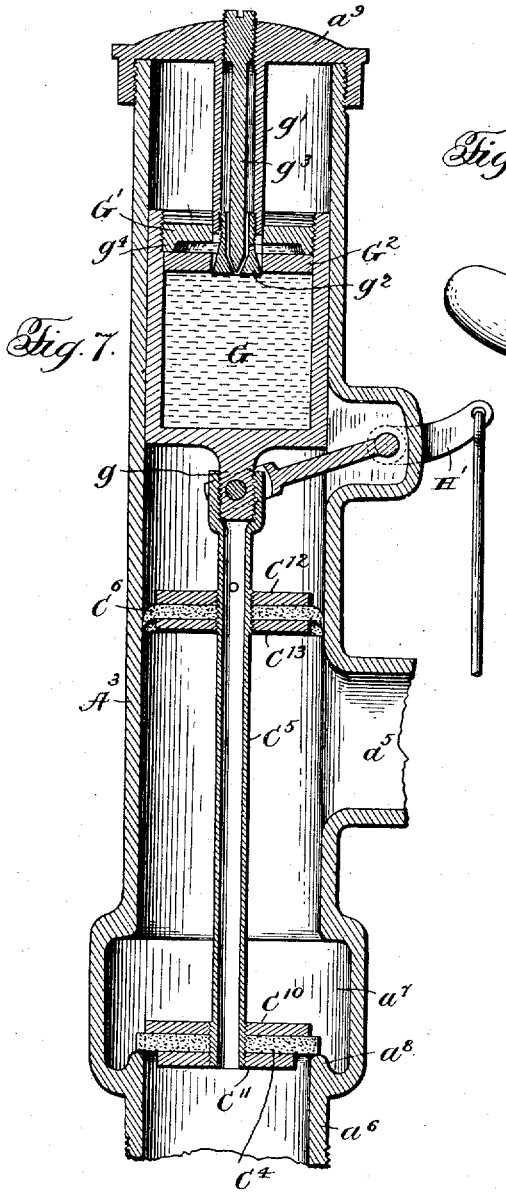
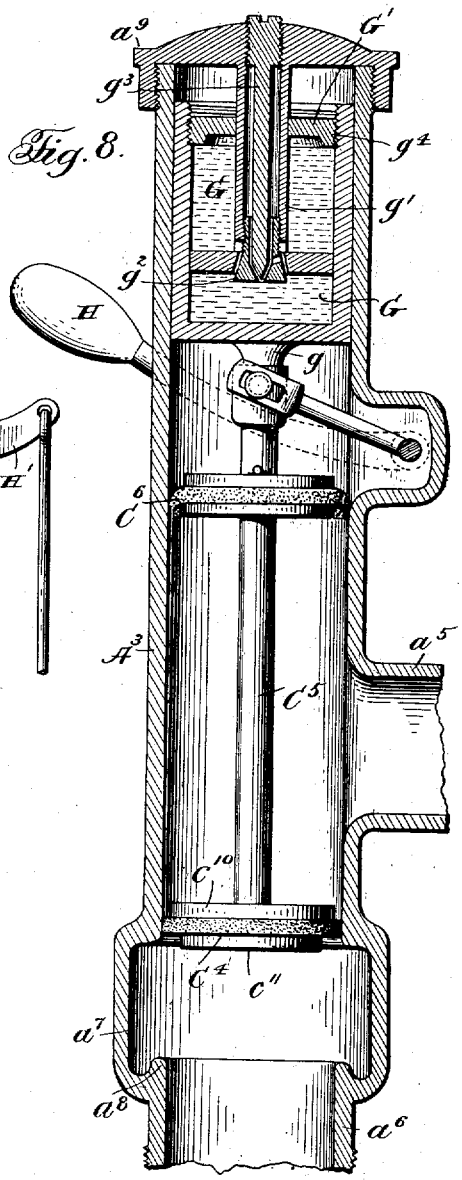
Witness:
Jas. E. Hutchinson:
By
Inventor:
Robert A. Brooks,
Bacon & Milane. Attorneys.
THE NORRIS PETERS CO., PHOTO-LITHO., WASHINGTON, D. C.

UNITED STATES PATENT OFFICE.

ROBERT A. BROOKS, OF CHICAGO, ILLINOIS, ASSIGNOR, BY MESNE ASSIGNMENTS, TO THE BROOKS MANUFACTURING COMPANY, OF CHICAGO, ILLINOIS, A CORPORATION OF ILLINOIS.

FLUSHOMETER.

14,198. Specification of Reissued Letters Patent. Reissued Oct. 10, 1916.

Original No. 849,105, dated April 2, 1907, Serial No. 183,790, filed December 4, 1903. Application for reissue filed October 18, 1915. Serial No. 56,643.

*To all whom it may concern:*

Be it known that I, ROBERT A. BROOKS, a citizen of the United States, and a resident of Chicago, Cook county, Illinois, have invented certain new and useful Improvements in Flushometers; and I do hereby declare that the following is a full, clear, and exact description of the same, reference being had to the accompanying drawings, and to the letters of reference marked thereon, which form a part of this specification.

This invention relates to improvements in flushometers, or flushing valves adapted for use in lieu of the usual elevated reservoir or tank in connection with urinals, waterclosets or wherever a flushing device is required.

Heretofore of the many devices of the kind put upon the market, it has been usual to provide an interior chamber into which the water or other flushing fluid is allowed to enter through a very small aperture, the accumulation of the fluid in said chamber actuating mechanism to close the flushing valve after the same has been put in operation manually. Inasmuch as the water usually used for flushing frequently contains various forms of animal and vegetable life, as well as sediment and matter held in suspension, the small passage soon becomes restricted or entirely closed by the accumulation of the same rendering it impossible for the device to operate satisfactorily.

The object of this invention is to provide a flushometer which may be either automatic in both opening and closing or automatic in closing only after having been actuated manually by an operator and in which the flushing fluid delivered through the flushometer is confined to the delivery chamber and outlet only, and in which, no matter how contaminated the fluid delivered therethrough the closing mechanism is unaffected thereby.

It is also an object of the invention to provide a comparatively cheap and simple though strong and durable construction of the class described and one not likely to get out of order through use.

The invention consists in the matters hereinafter described and more fully pointed out and defined in the appended claims.

Figure 2:
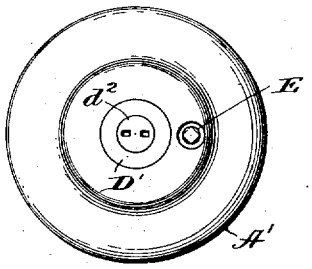
Figure 3:
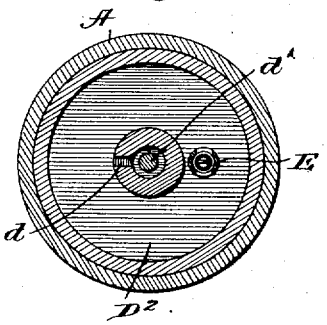
Figure 4:
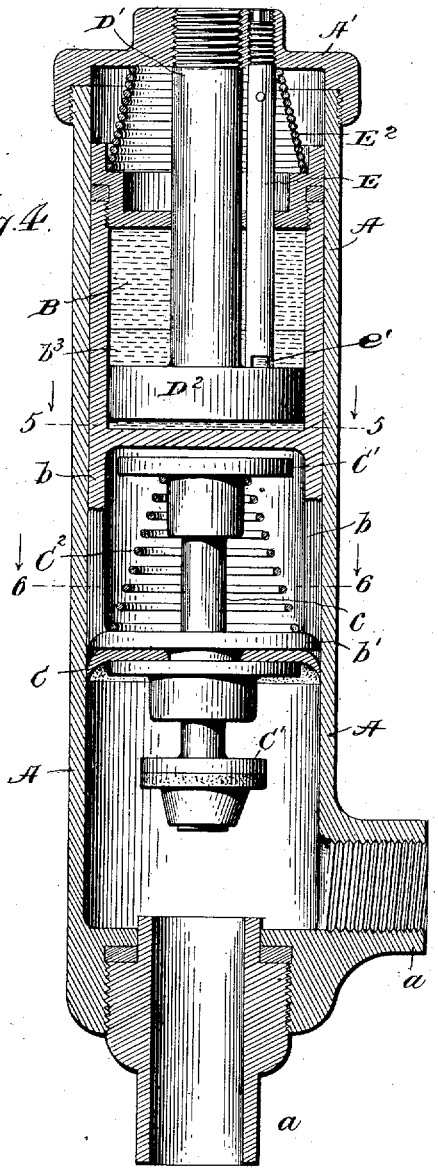
Figure 5:
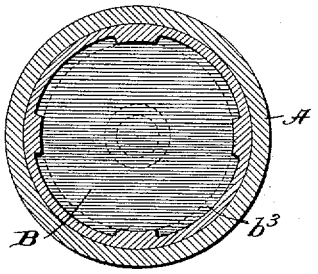
Figure 6:
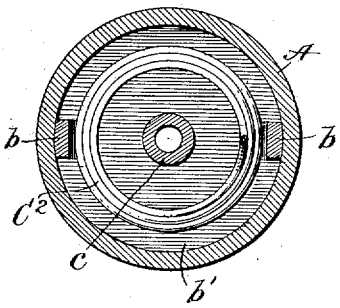

In the drawings: Figure 1 is a central vertical section taken through a flushometer adapted to be both self opening and closing and embodying my invention and showing the same closed. Fig. 2 is a top plan view of the same. Fig. 3 is a section taken on the line 3—3 of Fig. 1. Fig. 4 is a section similar to Fig. 1, showing the flushometer fully open. Fig. 5 is a section taken on line 5—5 of Fig. 4. Fig. 6 is a section taken on line 6—6 of Fig. 4. Fig. 7 is a central vertical section of a flushometer embodying my invention and adapted to be opened manually and to close automatically and shows the same fully closed. Fig. 8 is a similar section showing the flushometer closed after a preliminary flush.

As shown in said drawings, referring first to the construction shown in Figs. 1 to 6 inclusive, or in other words, to the flushometer adapted to open and close automatically, A indicates an outer casing or body of the flushometer which is closed at the top with a cap or cover A′. Near the bottom of the casing an inlet pipe *a* opens into one side thereof, affording a passage for the flushing fluid to be delivered through the flushometer. At the bottom of said casing section A is provided a discharge pipe *a′*, which, as shown, is enlarged near its upper end and screw threaded to engage in a threaded aperture in the lower end of said casing A. The upper end of said pipe *a′* extends upwardly within the water chamber in said casing and is shaped to afford a seat for a flushing valve C′, as shown in Fig. 1, which closes the discharge pipe *a′*. Fitting in said casing and movable longitudinally therein is a deep cup B, having a close fitting cup shaped cover B′, screw threaded thereon. A piston $D^2$ is provided in said cup and provided with a tubular piston rod D′, which extends upwardly through the cover B′ and has screw threaded engagement in said cap A′ and from which a small aperture opens through the piston and into which a restricted port *d* opens above the piston, as shown in Fig. 1. A rod *d′*, provided at its upper end with a screw threaded head $d^2$, which has threaded engagement in the upper end of the piston rod extends axially of said rod and is provided at its lower end with a pin which partly closes the aperture opening through the piston acting as a needle valve to control the rate of flow therethrough. Having threaded engagement in said cap A′ and extending therethrough and through a complemental aperture in the cover B′ is a rod E, which at its lower end fits into an aperture opening through the piston $D^2$ and cored out to afford a chamber in the lower end normally closed against upward pressure by the spring controlled valve *e*, but provided with ports *e′* above the piston, through which any fluid contained above the piston may readily and quickly flow back into the cup and through the piston both through the needle valve in the piston rod and through said valve *e*. As shown, the aperture through the piston is restricted at its lower end, so that screwing said rod E inwardly not only restricts the ports *e′*, but also limits the movement of the valve *e*, thus affording desired adjustment to control the flow of fluid. A coiled spring $E^2$ engages against the under side of said cap A′ and on said cover B′ and acts normally to force said cup with its contents, to the lowest point of its adjustment, as shown in Fig. 1. Integrally connected with the bottom of said cup are the downwardly extending arms *b*, connected at their lower ends with a transverse head *b′*, provided with a central downwardly extending threaded boss $b^2$, and apertured axially to receive the tubular valve stem *c* of the flushing valve C′, which extends upwardly therethrough and is provided at its upper end with an enlarged flanged head *c′*, apertured to afford a seat for the downwardly opening spring controlled valve $c^2$, which affords an outlet for the flushing fluid should the same rise above the head *b′*. A piston C is carried on said head *b′* and, as shown, comprises a sheet of leather $c^3$, or other suitable material affording a hydraulic packing and which fits closely in said casing and is held firmly against said head by the flanged follower $c^4$, which has threaded engagement with the boss $b^2$ and is provided in its end with an inwardly directed flange $c^5$, between which and the end of the boss $b^2$ is provided a seat to receive hydraulic packing $c^6$, which prevents leakage along the stem *c*. Bearing against the inner side of the head *b′* and beneath the flanged head *c′* is a coiled spring $C^2$, which acts normally to hold said flushing valve elevated into proximity with the piston. The flushing valve C′ may be constructed in any desired manner. As shown, however, the same comprises a flange on said stem *c* and a fiber washer $c^7$, engaged beneath the same and held in position by means of a conical nut $c^8$, as shown in Figs. 1 and 4.

The construction illustrated in Figs. 7 and 8 is a modified form of that before described and is adapted to be manually actuated in flushing and to close automatically. In this construction the casing $A^3$ is of a unitary nature and the lower end $a^6$ thereof is threaded for connection with the device to be flushed. An inlet pipe $a^5$ is integrally connected in said casing $A^3$ between the middle part thereof and the lower end, and an enlarged cylinder or chamber $a^7$ is provided between said inlet and outlet pipes and provided in its bottom with a raised annular seat $a^8$ to receive the flushing valve $C^4$, which is a simple piston valve of any desired construction, but as shown, provided with an upper and a lower valve plate $c^{10}$, $c^{11}$, between which is engaged a packing washer of leather, indurated fiber or other suitable material adapted to bear on said seat $a^8$, and all of which are rigidly secured together by means of the end threaded tubular stem $C^5$, which opens through said piston valve and extends upwardly therefrom and near its upper end is screw threaded to afford means for securing the piston $C^6$ thereto, which likewise comprises upper and lower plates $c^{12}$, $c^{13}$, having a packing washer secured between the same, and which fits tightly in the bore of the casing. Said tube $C^5$ is provided with an aperture just above the piston $C^6$ to permit any fluid finding its way above said piston to pass outwardly by means of said tubular stem into the discharge pipe. The upper end of said stem $C^5$ is internally screw threaded to engage the complementally screw threaded stem *g* of the cup G, which, as shown, fits closely in the bore of the casing $A^3$ and slides upwardly therein with the movements of said valves. Said cup is provided at its upper end with internal screw threads in which a head G′ is secured. The upper end of said casing $A^3$ is closed by a cap $a^9$, provided with a downwardly extending peripheral flange, which has threaded engagement with said casing. At the center of said cap $a^9$ is provided a downwardly extending tube *g′*, which, as shown, is integrally connected with the under side of said cap and which fits closely in a central aperture in said head G′ and is of a length to extend through said head when the flushing valve $C^4$ is seated. Having threaded engagement in the lower end of said tube *g′*, is a valve body $g^2$, which as shown, is conical with the base thereof directed downwardly. Said valve body is cored to provide a relatively large interior cavity which opens through the base into the cup G through a relatively small aperture. Threaded in the upper end of the tube *g′* and extending centrally through the cap $a^2$ and externally slotted for engagement with a screw driver or the like is a valve stem $g^3$, which is conical on its inner end to fit in the seat of said valve body $g^2$ and which is of a length to admit of adjustment inwardly or outwardly to regulate the passage through said valve body and affording together therewith a needle valve. Supported on said valve body $g^2$ is the sliding head $G^2$, which fits closely in the cup G and to the lower end of said valve body when the flushometer is in a closed position, owing to the conical form of the same, thereby providing a relatively small space between the same and the head G′ in which position downwardly directed peripheral flanges $g^4$ on said head G′ bear against the head $G^2$. An aperture is provided through said valve body $g^2$ at a point below the lower end of the tube $g'$ and, as shown, the lower end of said tube is notched to provide channels opening upwardly therefrom.

Any desired means may be employed for manually operating the device. As shown, however, a weighted lever H is pivoted within the casing and pivotally engaged on the stem $g$, of the cup G and the handle thereof extends outwardly through a slot in said casing in position to be manually engaged.

The operation is as follows: Referring first to the construction illustrated in Figs. 1 to 6 inclusive, it is evident that inasmuch as the flushing valve closing the discharge passage is much smaller than the piston C the fluid pressure on said piston is normally considerably greater than on the flushing valve and, supposing the device to have just flushed and the chamber B of the cup to be filled with mercury, oil or other fluid, as shown in Fig. 1, both above and below the piston $D^2$, the upward pressure of the liquid to be flushed on the piston C acts to force said cup upwardly against the tension of the springs $E^2$ and $C^2$, the tubular stem $c$ sliding through the stuffing box in the flushing valve compressing said spring $C^2$. The upward movement of the cup slowly forces the fluid therein upwardly through the apertures in the piston. As the mercury or other fluid slowly rises above the piston the tension constantly becomes greater on said springs until the head $b'$ contacts with the sleeve of the flanged head $c'$ and lifts the flushing valve. The spring $C^2$ now acts to snap the flushing valve high above its seat, as shown in Fig. 4, opening the discharge passage fully. In this position it is to be observed that approximately all of the fluid in the cup has been forced above the piston $D^2$. The spring $E^2$, fully compressed, now acts to force the cup B and piston C downwardly. Before this can be accomplished, however, the fluid must pass through the valves in said piston D into the cup below the same. This return flow can of course be controlled or regulated by the adjustment of the valves in said piston to permit the closure to be slow or rapid as preferred. The release of the flushing valve from its seat having caused the same to be forced upwardly on the stem $c$ by its spring $C^2$, the cup and the piston C must descend a sufficient distance to return the same to approximately their normal positions, or that shown in Fig. 1 before the flushing valve is in position to seat, after which the unequal pressures on said valve and piston C causes the operation to be repeated at regular intervals dependent upon the adjustment. As shown, the cup B is provided with vertical grooves in its side wall, indicated by $b^3$, which extend approximately half the height thereof and afford recesses to permit the fluid to pass the piston during a part of the upward and the downward movement of the cup.

The operation of the construction illustrated in Figs. 7 and 8 is substantially the same as that before described. The cup G is divided into an upper and a lower chamber by means of the partition $G^2$ supported upon the valve body $g^2$ and with the cup filled with mercury, oil or other suitable fluid, upward movement of the lever H, H′ acts to lift the valve $C^4$, starting flow through the flushometer and forcing fluid outwardly through the needle valve and above the partition $G^2$. Said partition is held from upward movement by the end of the pipe $g'$, while the cup with the head G′ moved upwardly to the position shown in Fig. 8, the fluid continuing to rise upwardly through the needle valve and through the spaces provided between said partition and the valve body until, as shown in Fig. 8, a greater portion of the fluid is in the upper chamber. If now the handle is released, the weight of the handle and of said fluid tends to draw the cup and the valves downwardly. Said movable partition $G^2$ drops to its lowest point on the valve body, opening up the port through said valve body, through which the fluid slowly flows, gradually increasing the weight in the lower chamber of the cup and carrying the valves downwardly until the lower valve $C^4$ is in position to seat and close the flushometer. In said Figs. 7 and 8 the chamber above the valve seat $a^8$ is shown relatively short vertically, so that when the cup is pushed upwardly, as shown in Fig. 8, a fore-flush is provided by said flushing valve first rising from its seat and then entering the bore of said casing, closing the same below the inlet passage. When so constructed, the flow ceases until the valve is allowed to descend into the chamber above the seat $a^8$, when the flushing is completed. This construction is particularly valuable in flushing closets in which instance an actuating rod H′ engages below the cup and is connected by operating levers in the usual or any desired manner with the closet seat so that pressure on the seat acts to lift the valve $C^4$ to the position shown in Fig. 8 and the valves are supported in said position until the weight is removed from the seat, when the flushing operation is completed, as the valve descends.

Obviously inasmuch as mercury, oil, glycerin, or other suitable material is used, in the cups and is free from sediment or other material adapted to clog any of the valves employed and as the flushing fluid cannot by any means reach the operating mechanism either of the constructions shown having been once adjusted will continue to operate indefinitely without further attention, and furthermore, should any of the fluids passing through said flushometer find access above the piston C or $C^6$, the same will be immediately drained away through the pipe *c* or $C^5$, as the case may be, and thus prevent the device ever becoming clogged on account of accumulation of fluid above said valves.

Obviously no stuffing box or glands are required about the operating lever, and the operative principle is the same in both the constructions shown, and many details of construction may be varied without departing from the principles of this invention.

I claim as my invention:

1. In an automatically opening and closing flushometer, the combination with a closed casing having an inlet-passage and an outlet passage, of a flushing valve seated on the outlet-passage, a piston positioned above the inlet-passage, a movable cup above said piston and comprising an upper and a lower chamber, a valve between the chambers, a fluid normally filling the lower chamber, means operated by the upward movement of the piston acting to force said fluid from one to the other of said chambers, means acting normally to force the cup downwardly, a yielding connection between the flushing-valve and the piston whereby upward movement of the piston acts to lift the flushing-valve and support the same above its seat until said piston has returned to near its normal position, and means retarding the return flow of the fluid in said cup acting to retard closure of the flushing valve.

2. In an automatically-operating flushometer, the combination with a closed casing, of a longitudinally-movable cup secured therein and containing a fluid, a fixed division-wall separating the same into an upper and a lower chamber and provided with a restricted passage through which said chambers communicate, a piston seated in said casing below said cup, means movable thereby acting to force the fluid from one chamber through said restricted passage into the other, means acting normally to hold said piston at the lower limit of its movement, a flushing valve connected with the piston and adapted to close with the pressure, and means acting to hold said flushing valve above its seat during a part of the movement of the piston.

3. In an automatically operating flushometer, the combination with a closed casing, of an inlet and an outlet pipe connected therein, a flushing valve seated to close the outlet pipe with the pressure, a piston positioned above the inlet pipe, a downwardly extending tubular stem opening through the piston and passing through the flushing valve, a fluid containing cup above the piston and means operated by pressure of said fluid acting to control the movement of said valve, a spring on said stem bearing upwardly on said flushing valve whereby upward movement of the piston acts to compress said spring until the flushing valve is raised whereupon said spring holds said valve above its seat until the piston is returned to approximately its normal position.

4. In an automatic flushometer, the combination with a closed casing, of an inlet pipe opening thereinto, a discharge pipe opening therefrom below the inlet pipe, a flushing valve seated on the discharge pipe and adapted to close the same with the pressure, a piston of greater diameter positioned above the same and closing the casing above the inlet, a downwardly extending tubular stem on said piston which opens therethrough and passes through the flushing valve, a spring carried thereon and bearing upwardly on the flushing valve and resisting upward movement of the piston and fluid operated means acting to regulate the flushing and retard the closing after flushing.

5. In an automatic flushometer, the combination with a closed casing of an inlet and an outlet pipe connected therein, a flushing valve seated to close the outlet pipe with the pressure, a piston seated to close the casing above the inlet valve, a stem connecting the valve and piston and slidably engaged in one of the same, a spring carried on said stem and acting to elevate the flushing-valve when unseated, a spring acting normally to resist upward movement of the piston, and fluid operated means actuated by said piston and acting to regulate the flushing and closing the flushing valve.

6. In an automatic flushometer, the combination with a cylindric casing, of an apertured partition secured therein out of contact with the side walls thereof, a piston in said casing, a closed cup thereon slidably engaged intermediate said casing and said partition, a fluid in said cup, a flushing valve adapted to seat with the pressure and to remain seated during part of the travel of the piston, and means acting to force said fluid from one side of the partition to the other.

7. In an automatically opening and closing flushometer, the combination with a casing, of an inlet and an outlet pipe connected therein, a piston positioned above the inlet pipe, a flushing valve yieldingly connected therein and normally closing the outlet passage and of less area than the piston, a cup above the piston, a valved partition dividing the same into chambers, a spring bearing against the bottom of the cup and against a part carried on the flushing valve, and a fluid partly filling said chambers, whereby upward movement of the controlling valve acts to force the fluid in the cup from one to the other chamber, thereby controlling the operation of the valve.

8. In an automatic flushometer, the combination with a flushing valve, at the bottom of the water chamber, adapted to close with the pressure, of a cup positioned above the water chamber, means adapted to move said cup independently of the flushing valve, a valved partition suspended from the top of the casing and dividing the cup into upper and lower chambers, a fluid in one or more of said chambers, means operated by the movement of the cup acting to raise the flushing valve and simultaneously force the fluid in the cup from one side of the partition to the other, and means retarding the flow of said fluid acting to regulate the reseating of the flushing valve.

9. In a self opening and closing flushometer, the combination with a closed casing, of an inlet and an outlet pipe connected therein, a piston above the inlet-pipe, a flushing valve of smaller diameter yieldingly connected therewith and positioned to close the discharge orifice and affording a water chamber between said valves, a reciprocating cup secured in the casing above the piston, a valved partition therein, adapting the cup to move thereon and dividing the same into a plurality of chambers, a fluid partly filling the cup, and means operated by the upward movement of the piston acting to cause displacement of the fluid in one of the chambers of said cup and a spring acting to seat the flushing valve and reverse the flow of the fluid in the cup, and means retarding said flow.

10. In an automatically operated flushometer, the combination with a closed casing having an inlet and an outlet opening, of a piston above the inlet opening, a flushing valve closing the outlet opening with the pressure and adapted to remain seated while the piston travels therefrom, means regulating the operation of said valve and piston embracing a closed cup carried on said piston, a valved partition therein rigidly engaged on the casing, a fluid partly filling the cup and operative connection between said valve and the cup acting to trip the valve and time the operation thereof by the flow of fluid through the chambers of the cup, and means regulating said flow therethrough.

11. In a self opening and closing flushometer, the combination with the casing, of an inlet and outlet pipe connected therein, a flushing valve seated to close the outlet pipe with the pressure, a piston in said casing above the inlet pipe and of greater diameter than the flushing valve, a longitudinally movable cup above the piston, a valved partition therein adapting the cup to move thereon and dividing the same into chambers, a fluid filling one or more of said chambers, means operatively connected with the piston acting to force said fluid from chamber to chamber in said cup during the upward movement of the piston and a spring acting to close the flushing valve after flushing.

12. In an automatically opening and closing flushometer, the combination with a cylindric casing having an outlet and an inlet aperture, a flushing valve adapted to control said outlet, an upwardly directed tubular stem thereon provided with a flanged head, a reciprocating piston intermediate said valve and said head, means engaged between the piston and head adapted to unseat said valve when the piston reaches the upward limit of its travel, a closed cup carried on said piston, an apertured partition therein nonmovable with respect to said cup, and a fluid in said cup adapted to pass through said partition during the operation of the flushing valve.

13. In a flushometer, the combination with a cylindric casing, of an apertured partition secured therein out of contact with the side walls thereof, a piston in said casing, a tubular stem extending therethrough, a closed cup in said casing and slidably engaged intermediate the same and said partition, a fluid in said cup, and a valve in said partition affording a more rapid flow of said fluid therethrough in one direction than in the other.

14. In a flushometer, the combination with a casing having inlet and outlet apertures therein, of an apertured partition suspended in said casing out of contact with the side walls thereof, a piston movable in said casing, a flushing valve thereon adapted to control the outlet, a cup carried above the piston and movable thereby and projecting between the partition and casing, a fluid in said cup adapted to pass back and forth through the partition, and means in said partition affording a more rapid flow of said fluid in one direction than in the other.

15. In a flushometer, the combination with a casing having inlet and outlet apertures therein, of a flushing valve seated to control said outlet, a partition in said casing, a cup operatively connected with said valve and adapted to slidably engage between said partition and casing, a fluid in said cup, and means in said partition adapted to permit said fluid to flow through the partition faster in one direction than in the other.

16. In a flushometer, the combination with a casing having outlet and inlet ports therein, of a valve controlling the outlet port, an apertured partition in said casing, a controlling fluid in said casing disconnected from the flushing fluid, means for forcing said controlling fluid back and forth through the partition, and means affording a faster flow of said fluid in one direction through the partition than in the other.

17. In a flushometer, the combination with a casing having an inlet and an outlet opening therein, a valve seated to close the outlet opening, a piston in said casing above the inlet opening, a valve stem on said valve extending upwardly through the piston, a closed cup in the casing adapted to be moved vertically by said piston, an operating fluid therein, a stationary apertured partition in said cup, and means in said partition adapted to permit a more rapid flow of said fluid therethrough in one direction than in the other.

18. A flushometer for the purpose described comprising a casing having inlet and outlet apertures, a flushing valve for controlling the passage of fluid through the apertures, a fixed partition associated with the valve and having a supporting stem, a fluid containing cup in which the partition is located, said cup being connected with the valve and movable relatively to said partition, a cover for the end of the cup adapted to close the same against the escape of contained fluid and for sealing the cup against the entry of flushing water, means for causing the cup to move alternately in opposite directions, said movement resulting in the opening and closing of the valve, and means affording a faster flow of the fluid in the cup in one direction of its movement than in the other.

19. A flushometer for the purposes specified comprising a casing having inlet and outlet apertures, a flushing valve for controlling the passage of fluid through the apertures, a fixedly supported piston associated with the casing, a cup for containing a retarding fluid and in which the said piston is located, a cover for the cup closing the same against the escape of the fluid therein contained and preventing the entry of flushing water thereto, connected means for causing a movement of the cup upon the movement of the fluid, and means affording a faster flow of the fluid in the cup in one direction than in the other.

20. In a flushometer for the purpose specified, the combination with a casing having inlet and outlet apertures, a flushing valve for controlling the passage of fluid therethrough, a piston associated with the valve having a stem fixedly supported and having a passage therethrough, a cup for containing a retarding fluid and having a closing cap through which the stem passes, a spring above the piston for causing a relative movement between the cup and piston, connections between the valve and the cup, and means for affording a faster flow of fluid through the piston in one direction of movement of the cup than in the other.

21. In a flushometer, the combination with a casing having inlet and outlet apertures therein, of a flushing valve adapted to be seated to control said outlet, a fixedly supported partition associated with the casing, a cup operatively connected with said valve and adapted to slidably engage said partition, a fluid in the cup, means in the partition adapted to permit said fluid to flow through the partition faster in one direction than in the other, and a cover for the cup closing the same against the escape of the fluid therein contained and preventing the entry of flushing water thereto.

In witness whereof, I have hereunto set my hand this 27th day of September, 1915.

ROBERT A. BROOKS.

Witnesses:

ISABELL BROOKS,

ALVIN LESLIE CASPARI.

Copies of this patent may be obtained for five cents each, by addressing the "Commissioner of Patents. Washington, D. C."